Sept. 5, 1933.  P. ALBOHR  1,925,475
APPARATUS FOR THE PASTEURIZATION OF MILK
Filed Jan. 25, 1932  2 Sheets-Sheet 1
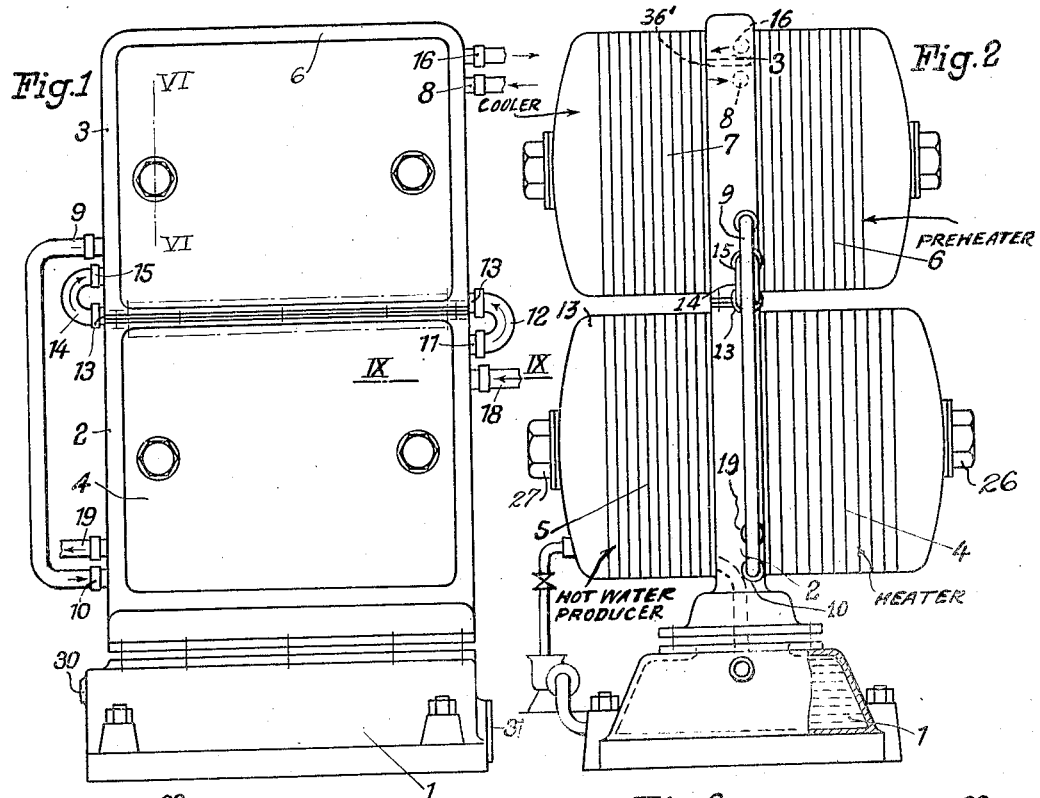
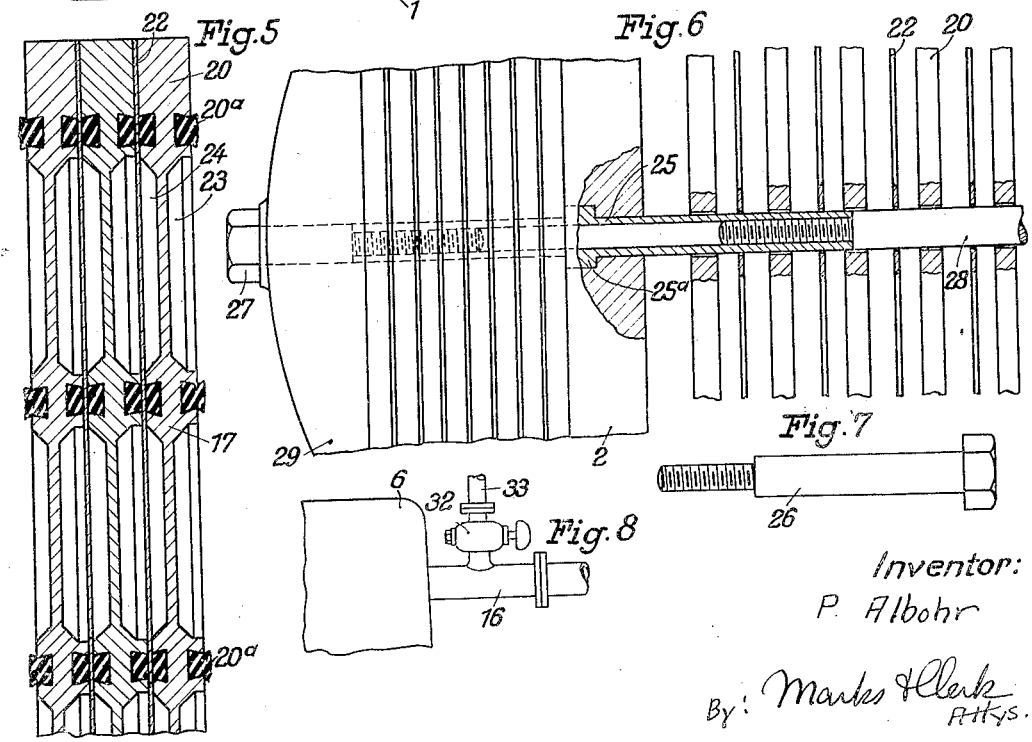
Inventor:
P. Albohr
By: Marks & Clerk
Attys.

Sept. 5, 1933.   P. ALBOHR   1,925,475
APPARATUS FOR THE PASTEURIZATION OF MILK
Filed Jan. 25, 1932   2 Sheets-Sheet 2

Inventor:
P. Albohr

Patented Sept. 5, 1933

1,925,475

UNITED STATES PATENT OFFICE 1,925,475

APPARATUS FOR THE PASTEURIZATION OF MILK

Peter Albohr, Hanover, Germany

Application January 25, 1932, Serial No. 588,731, and in Germany November 10, 1930

16 Claims. (Cl. 257—245)

This invention relates to so-called plate pasteurizers, i. e. milk heaters in which the heat interchange elements are formed of a number of plates between which the milk to be freed from bacteria flows in alternate directions and the hot water or steam serving for heating purposes flows through ducts constructed on the plate surfaces.

It is already known to combine such milk heaters with a second similar nest of plates which is traversed by the heated milk and, in counter-current thereto, by the raw milk which is still to be heated. The purpose of the arrangement of this second nest of plates is on the one hand to cool down the heated milk by means of the raw milk, and on the other hand preliminarily to heat the raw milk by means of the heat contained in the hot milk.

It has also already been proposed to assemble heat interchangers for such purposes from vertically arranged plates and to use one group of plates as a pasteurizing device and another group as a preheater or precooler. According to these proposals, however, the individual groups of plates or plate nests are not separately accessible, which is very disadvantageous for the operation, and more particularly for the cleansing which has to be regularly effected. On the other hand such heaters with a successive series of plate nests are subjected to frequent operative disturbances inasmuch as air pockets form in the flow ducts or conduits owing to the air and gases expelled in the heater and preheater. Whereas horizontal plates are naturally arranged one above the other, and therefore it is also obvious to arrange the preheater nest above the heater nest, in the case of vertical plates the preheater nest cannot forthwith be set up on the heating nest.

In contradistinction thereto, the subject of the invention is an apparatus provided with a preheater, more particularly for pasteurizing milk, which is characterized by the fact that the preheater elements, consisting of vertical plates, are arranged above the heater elements, which are likewise formed of vertical plates, and the ducts and channels in and between both devices are so constructed that the milk being heated, or the heated milk being used for preheating traverses both devices successively in continuously ascending current. With such a construction for the device there is no possibility of the formation of air locks over the whole path traversed by the milk from the entry into the heater nest up to exit from the preheater nest, since the air and gases expelled from the milk are carried along with the latter into the flow ducts or conduits and can rise at the turning places leading to the top. In this way operative impediments are avoided, and the formation of froth is substantially diminished.

The invention also embraces a support for carrying the heater nest and the preheater nest, which enables the plate nests consisting of vertical plates to be arranged one above the other. This support is advantageously made in two parts, so that it consists of two closed frames one above the other. This construction for the support has the advantage that it can also be used for smaller throughputs, and without the pre-insertion of a preliminary heater, by dispensing with the upper framework. The supply and withdrawal conduits for the plate nests are then preferably disposed within the support, so that the connecting nozzles for the nests of plates can be provided in the plates abutting directly on to the support. In this way it is possible to open and clean the plate nests without the connecting pipes having to be loosened. This is a further considerable technical advantage, particularly for the heater nest, which has frequently to be cleaned.

Between the (lower) heater nest and the (upper) preheater nest there is arranged according to the invention a flow-retarding vessel of the known kind, which may be disposed wholly or partially in the framework. This flow-retarding vessel is a safety device inasmuch as by it the milk is maintained for a definite short time at the temperature necessary for killing certain bacteria. At the same time it is ensured that the milk is reactive to the control laid down by legal orders. In this way an arrangement is obtained in which the upper connecting nozzle of the heater plates and the lower connecting nozzle of the preheater plates lie on different sides of the support, which has the simultaneous advantage that substantially the same pattern of plates can be used for the heater and the preheater.

In a preferred constructional form according to the invention the support is so constructed that on one side of the same the heater nest and the preheater nest are supported one above the other, and on the other side the hot water nest and the cooling nest, each assembled from individual plates, are likewise supported one over the other. In this way the hot water nest, by heat exchange with steam serves for producing the hot water required for the milk heater nest, whilst in the cooler nest the heated milk is cooled down in the usual manner after it has already given up a part of its heat content to the raw milk. More particularly, this simple and compact construction for the heater in which the support carries altogether four heat exchanger nests arranged in pairs over one another has proved to be very suitable indeed for reducing to a very small bulk the heat exchanger appliances necessary for a heater plant even if the said appliances are intended for large throughputs.

By the arrangement of heat exchanger nests on both sides of a support the corresponding connecting nozzles of two opposite nests are so arranged that they are in direct communication through the support, and more particularly pipe conduits are avoided. In this way the whole heater is considerably simplified and cheapened and a compact construction is obtained in which numerous projecting parts and long pipe conduits are dispensed with.

Further, the invention also comprises a heat interchanger in which the plates are supported by two horizontal tubular members secured to a support, said tubes being threaded on the interior, screws being screwed therein for the firm tensioning of the plates. This securing and tensioning device for the heat interchanging plates has the advantage that it is extraordinarily simple, and does not substantially occupy any more space than the nest of plates itself. In spite of the short length of the said tubular members the nest is cleansed very simply, extension rods being screwed into the tubes instead of the tensioning screws.

A preferred constructional form of the invention consists in a two-sided form for the support, such that two tubular members passing right through the support and secured therein against longitudinal displacement serve each for supporting a plate nest on each side of the support.

The plates are preferably placed upon the tubular members by means of holes situated near the edges of the plates, the projecting ledges which form the flow ducts being inwardly displaced somewhat at the points where the holes are provided, so that the said tubular members can pass through the plates without interfering with the path of flow.

In the accompanying drawings one construction of the subject of the invention is shown by way of example.

Figures 1 and 2 show front and side elevations of the support with four plate nests arranged thereon.

Figures 3 and 4 show in elevation two co-operating plates arranged one above the other, the lower belonging to the heater nest, and the upper to the preheater nest, and the path of the continuously ascending stream of the heated milk or the milk to be heated while the paths of the raw milk (Fig. 4) or hot milk (Fig. 3) flowing in counter-current on the rear side of the plates are shown so far as necessary in dash lines.

Figure 5 shows in section along line V—V of Fig. 3 a number of double sided mutually abutting plates, with sheets of metal inserted in between in the usual manner.

Figure 6 shows in partial section along line VI—VI of Fig. 1 the device used for guiding, tensioning, and cleaning the plates.

Figures 7 and 8 show details.

Figure 9:
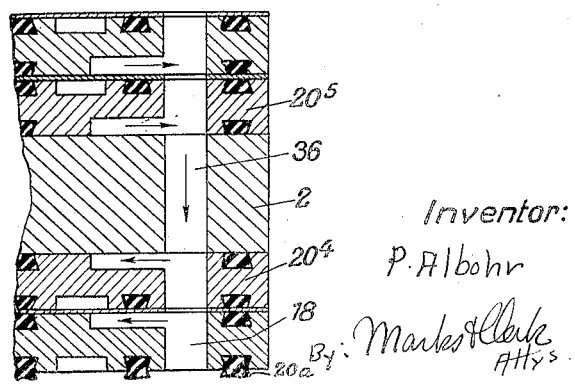

Figure 9 shows a horizontal partial section along the line IX—IX of Figure 1, showing an aperture in the support 2 for connecting the hot water producer 5 and the heater 4 which may take the place of the connecting pipe 18 shown in Fig. 1.

The support carrying the different heat interchanging devices consists (Figures 1 and 2) of the base member 1, the lower frame portion 2, and the upper frame portion 3. The three portions can be connected with one another by screwing, by means of suitably arranged flanges or the like. The lower portion of the frame 2 carries the heater proper, 4, and the hot water producer 5, the preheater 6, and the cooler 7 being arranged on the upper portion 3, of the support.

The cold raw milk enters the preheater at 8 (Figure 1) and flows through the same in a downward direction, whilst being gradually heated by the hot milk from heater 4, there being no danger of air and gas bubbles hindering the operation owing to the low temperature; the raw milk comes out again at 9, and enters the lowermost inlet of the heater 4, at 10, by means of a connecting pipe. The milk traverses this heater, flowing through the ducts 34, Fig. 3, in an upward stream, as a result of which it is heated by hot water from hot water producer 5 flowing in counter-current thereto, and then enters the flow-retarding vessel formed by the connecting channel 13 at the point 11 through the curved pipe 12; the channel 13 is connected to the lower inlet nozzle 15 of the preheater by means of the curved pipe 14, so that the channel 35 of the preheater is traversed in an upward direction, and the milk is cooled down by the raw milk flowing in counter-current thereto. The milk may either be supplied from the upper exit orifice 16 of the preheater to any desired cooler, in which final cooling is effected, or else it passes directly and by the shortest path (e. g. through a recess 36' in the support) to the cooler 7 arranged on the rear side of the preheater.

As is shown in Figure 8, an air- or gas-removing valve is preferably arranged on the top of the exit nozzle 16, of the preheater nest, said valve consisting for example of a cock 32, to which gas conduit 33 can be attached.

In the same way as the raw milk is led in the preheater in counter-current to the ascending milk, steam or hot water is passed in counter-current in the heater, it entering at 18 and coming out again at 19, whence it is led away, or it may be discharged into a water box 1 in the base member. If hot water is used for the heating, this is preferably heated in the hot water producer 5, to be arranged on the common support; this hot water producer consists of a number of abutting plates 20 tensioned together, as in the other heat interchangers. In order that the arrangement may be understood connecting nozzles 18 and 19, Figs. 3 and 4, for the entry and exit of hot water are shown by way of example on the support 2 in Figure 1, although these may be dispensed with and replaced by bores provided in the support, such that the hot water can pass directly from the abutting plate $20^5$ of the hot water producer 5, to the abutting plate $20^4$ of the heater 4, through the bore 36 of the support 2 (see Figure 9). A special connecting pipe is therefore not necessary at all. Similarly the outlet nozzle 19 can also be dispensed with if the water issuing from the heater nest is allowed to fall through the support straight into the water box 1, constructed in the form of a foot for the support, the water being removed from the said box through the nozzle 31 by a circulating pump so that it can be used again in the steam or water nest 5. The water box 1, is preferably provided with an overflow 30.

Figure 4:
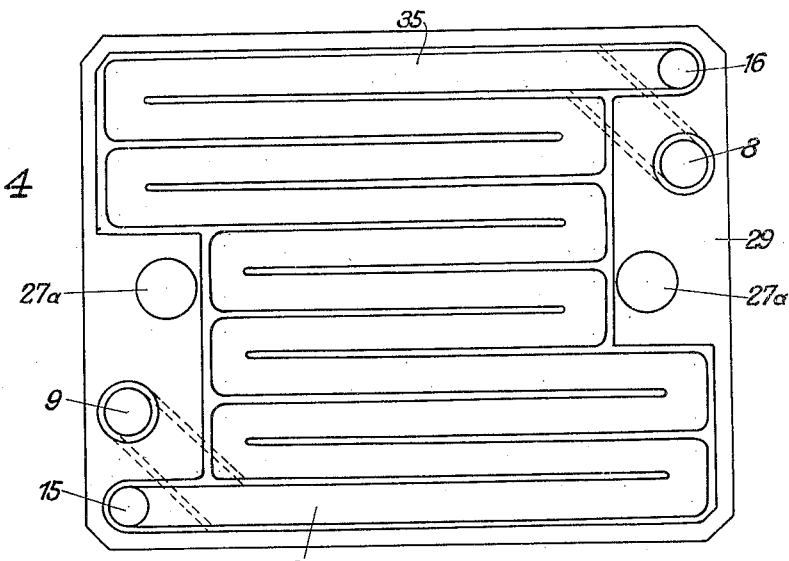
Figure 3:
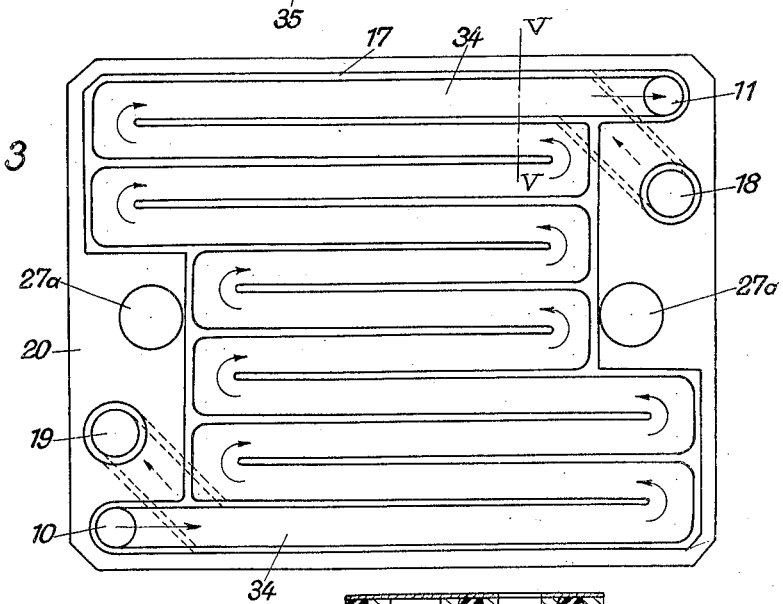

The construction of the plates which enables the milk to pass in a continuously ascending stream both through the heater and the preheater and so avoid the formation of air locks is to be seen in Figures 3 and 4. The plates 20 shown in the figures are provided on both sides in the known manner with limiting elevations 17 by which the flow channels 34, 35 are formed. Rubber sealing members 20ᵃ may be embedded in the known manner in the said elevated portions in order to produce a better sealing. A thin sheet metal plate 22 is inserted between each pair of plates 20 and it is mainly through this plate that heat interchange takes place. The path which the milk traverses between the plate and the sheet metal is fixed by the inlet 10 and outlet 11 of the heater plates as well as the inlet 15 and the outlet 16 of the preheater plates and follows the direction shown by the arrows. The channels on the rear sides of the plates for these two interchange media accurately register with those traversed by the milk, except for the inclined connecting portions provided at the connection nozzles. Provision is made therefore for an almost perfect interchange on the counter-current principle, as a result of which the most favourable degree of thermal efficiency is obtained.

The hot water producer 5 and the cooler 7 are preferably assembled from plates similar to those shown in Figures 3 and 4, the pasteurized milk cooled in the preheater streaming for example in a downward direction in the cooler in counter-current to the upwardly streaming cooling water. The milk coming out of the preheater at 16 can enter the cooler straight away through the passage 36' in the support. In the hot water producer 5 the water forced along by the circulating pump and previously used in the heater nest 4 and consequently still comparatively warm, is heated by the steam supplied to the neighbouring intermediate spaces of the plates. The resulting hot water then enters the hot water nozzle 18 of the heater through a curved pipe or some other short pipe conduit.

All four heat interchangers, 4, 5, 6 and 7, may be constructed in substantially the same way. It has been found, however, that it is preferable to construct the double sided plates 20 of the heater nest 4 with deeper plate intermediate spaces 23 for the hot water on the one side and with shallower spaces 24 for the milk on the other side, since it is necessary to supply about double the quantity of hot water for a given quantity of milk in order to produce a favourable heater efficiency.

The plates 20 as well as the metal sheets 22 placed in between the same are provided with bores 27ᵃ, Figs. 3 and 4, by means of which they are guided on the pins to be arranged on the support. The limiting elevated portions are arranged in such a way that, at those places where the bores 27ᵃ are situated, they are drawn in a little. In this way it is ensured that the bores pass through the plates outside the path of flow, so that no special sealing for the path of flow is required in respect of the said bores.

The plates 20 as well as the smooth metal sheets 22 arranged in the known manner in between the same are preferably supported by two tubular members 25 which are stuck through the support 2 and abut on the rear side of the same by means of a holding member 25ᵉ, such as a collar. Double tubular members 25 serve for carrying plate nests 4 and 5 on the front and rear sides of the support 2. The firm tensioning of the plates slipped on to the tubular members 25 is brought about by means of the tensioning screws 26 and 27 which are screwed into the ends of the said tubular members, the pressure of the tensioning screws being transferred to the plates by a suitably constructed cover plate 29. With plates arranged in this way the cleansing can be effected individually very simply for each plate nest by screwing extension rods 28 into the tubular members 25 in place of the tensioning screws 26 and 27. These extension rods enable the separate plates of each nest to be spaced apart and the surfaces to be cleaned rendered accessible.

What I claim is:

1. A milk pasteurizer comprising a milk heater and a superposed milk preheater connected by ducts, each heater consisting of nests of vertical plates which are grooved and so give rise when assembled to fluid-conducting channels throughout the heater, the preheated milk from the preheater traversing channels of the milk heater in a continuously ascending stream, passing through said connecting ducts to the preheater, and then traversing channels of the latter in a continuously ascending stream whilst exchanging heat with, and thereby preheating, freshly introduced cold milk.

2. A milk pasteurizer comprising a supporting stand consisting of two frames disposed one above the other, a milk heater, consisting of a nest of vertical plates which are grooved and so give rise when assembled to fluid-conducting channels throughout the heater, secured to the lower part of said supporting stand, a similarly constituted milk preheater secured to the upper part of said supporting stand, supply and withdrawal nozzles communicating with said channels on the end plates of each nest adjacent to the supporting stand, and connecting ducts connecting said heater and preheater, the preheated milk from the preheater traversing channels of the milk heater in a continuously ascending stream, passing through said connecting ducts to the preheater, and then traversing channels of the latter in a continuously ascending stream whilst exchanging heat with, and thereby preheating, freshly introduced cold milk.

3. A milk pasteurizer comprising a milk heater and a superposed milk preheater connected by ducts, each heater consisting of nests of vertical plates which are grooved and so give rise when assembled to fluid-conducting channels throughout the heater, and a flow-retarding container connecting the hot milk exit of the heater and the hot milk inlet of the preheater, the preheated milk from the preheater traversing channels of the heater in a continuously ascending stream, traversing the said flow-retarding container where it is maintained at a definite temperature for a short time, and then traversing channels of the preheater in a continuously ascending stream whilst exchanging heat with, and thereby preheating, freshly introduced cold milk.

4. A milk pasteurizer comprising a supporting stand consisting of two frames disposed one above the other, a milk heater, consisting of a nest of vertical plates which are grooved and so give rise when assembled to fluid-conducting channels throughout the heater, secured to the lower part of said supporting stand, a similarly constituted milk preheater secured to the upper part of said supporting stand, supply and withdrawal nozzles communicating with said channels, on the end plates of each nest adjacent to the supporting stand, and connecting ducts connecting said milk heater and preheater, one of said ducts being within the supporting stand and connecting the hot milk exit of the heater and the hot milk inlet of the preheater and acting as a flow-retarder wherein the milk is maintained at a definite temperature for a short time, the preheated milk from the preheater traversing channels of the heater in a continuously ascending stream, passing through said flow-retarders and then traversing channels of the preheater in a continuously ascending stream whilst exchanging heat with, and thereby preheating, freshly introduced cold milk.

5. A milk pasteurizer comprising a milk heater and a superposed milk preheater connected by ducts, each heater consisting of nests of vertical plates which are grooved and so give rise when assembled to fluid-conducting channels throughout the heater, a similarly constituted hot water producer and superposed cooler and ducts interconnecting the two milk heaters, the hot water producer and the cooler, hot water being produced in the hot water producer by heat interchange with steam and supplied to the milk heater for heating the milk stream continuously ascending therein, the heated milk from the milk heater continuously ascending in the milk preheater, and imparting some of its heat to freshly introduced cold milk, and then passing to said cooler where it is finally cooled.

6. In the pasteurizer claimed in claim 5, a flow-retarding vessel in which the milk is maintained at a definite temperature for a short time on its passage from the milk heater to the preheater.

7. A milk pasteurizer comprising a supporting stand consisting of two frames disposed one above the other, a milk heater, consisting of a nest of vertical plates which are grooved and so give rise when assembled to fluid-conducting channels throughout the heater, secured to the lower part of one side of said supporting stand, a similarly constituted milk preheater secured to the stand above said heater, a similarly constituted hot water producer and superposed cooler secured to said stand on the other side thereof, ducts interconnecting the two milk heaters, the hot water producer and the cooler which are partly within said stand, hot water being produced in the hot water producer by heat interchange with steam and supplied to the milk heater for heating the milk stream continuously ascending therein, the heated milk from the milk heater continuously ascending in the milk preheater, and imparting some of its heat to freshly introduced cold milk, and then passing to said cooler where it is finally cooled.

8. In the pasteurizer claimed in claim 7, a flow-retarding vessel in which the milk is maintained at a definite temperature for a short time on its passage from the milk heater to the preheater.

9. In the pasteurizer claimed in claim 7, a flow-retarding vessel in which the milk is maintained at a definite temperature for a short time on its passage from the milk heater to the preheater, said vessel being within the supporting stand.

10. In the preheater claimed in claim 5, a supporting stand comprising a pedestal constructed as a water box for receiving the used hot water, the latter being circulated by means of a pump for reuse.

11. A pasteurizer as claimed in claim 2, in which the nests of plates constituting the heater and preheater are secured to the supporting stand by means of pins attached to the latter which are provided with members, such as collars, which abut on one surface of the stand.

12. A pasteurizer as claimed in claim 5, in which the nests of plates constituting the heater and preheater are secured to the supporting stand by means of pins attached to the latter which are provided with members, such as collars, which abut on one surface of the stand.

13. A pasteurizer as claimed in claim 2, in which the nests of plates constituting the heater and preheater are secured to the supporting stand by means of pins attached to the supporting stand, said pins being tubular members with interior threads adapted to receive screw members for tensioning together the plates or for receiving extension rods for supporting the constituent plates when the nest is dissembled.

14. A pasteurizer as claimed in claim 5 in which the nests of plates constituting the heater and preheater are secured to the supporting stand by means of pins attached to the supporting stand, said pins being tubular members with interior threads adapted to receive screw members for tensioning together the plates or for receiving extension rods for supporting the constituent plates when the nest is dissembled.

15. A pasteurizer as claimed in claim 2 in which the nests of plates constituting the heater and preheater are secured to the supporting stand, the apertures in the plates for receiving the holding pins being placed so as not to interfere with the grooves in said plates.

16. A pasteurizer as claimed in claim 5 in which the nests of plates constituting the heater and preheater are secured to the supporting stand by means of pins attached to the latter which are provided with members, such as collars, which abut on one surface of the stand.

PETER ALBOHR.